US012645586B2

(12) United States Patent
Kim

(10) Patent No.: US 12,645,586 B2
(45) Date of Patent: Jun. 2, 2026

(54) CONTROLLER AND MEMORY SYSTEM CONTROLLING GARBAGE COLLECTION OPERATION AT POWER-ON, AND METHOD OF OPERATING THE CONTROLLER AND MEMORY SYSTEM

(71) Applicant: SK hynix Inc., Icheon-si Gyeonggi-do (KR)

(72) Inventor: Wan Kim, Icheon-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 31 days.

(21) Appl. No.: 18/316,111

(22) Filed: May 11, 2023

(65) Prior Publication Data

US 2024/0160564 A1      May 16, 2024

(30) Foreign Application Priority Data

Nov. 14, 2022     (KR) ........................ 10-2022-0151234

(51) Int. Cl.
*G06F 12/02* (2006.01)

(52) U.S. Cl.
CPC ...... *G06F 12/0261* (2013.01); *G06F 12/0253* (2013.01)

(58) Field of Classification Search
None
See application file for complete search history.

(56) References Cited

U.S. PATENT DOCUMENTS

| | | | |
|---|---|---|---|
| 8,806,271 B2 | 8/2014 | Yong et al. | |
| 2012/0191937 A1* | 7/2012 | Feldman | G06F 12/0246 |
| | | | 711/170 |
| 2017/0337001 A1* | 11/2017 | Lee | G06F 3/0626 |
| 2018/0081551 A1* | 3/2018 | Lee | G06F 11/1469 |
| 2018/0373629 A1* | 12/2018 | Kim | G06F 3/0632 |
| 2019/0026224 A1* | 1/2019 | Koo | G06F 9/4406 |
| 2019/0252007 A1* | 8/2019 | Kim | G11C 5/148 |
| 2019/0310921 A1* | 10/2019 | Lee | G06F 3/0616 |
| 2020/0264959 A1 | 8/2020 | Byun | |

FOREIGN PATENT DOCUMENTS

| | | |
|---|---|---|
| KR | 1020190096625 A | 8/2019 |
| KR | 1020190118016 A | 10/2019 |
| KR | 102076248 B1 | 2/2020 |

* cited by examiner

*Primary Examiner* — Yaima Rigol
(74) *Attorney, Agent, or Firm* — WILLIAM PARK AND ASSOCIATES LTD.

(57) ABSTRACT

A method of operating a controller includes sensing power-on of a memory system including a semiconductor memory device, determining whether to delay a garbage collection operation performed during an initial operation of the memory system, based on a sudden-power off (SPO) count value, and controlling the semiconductor memory device to perform the garbage collection operation based on the determination result.

15 Claims, 8 Drawing Sheets

FIG. 4B

BLKa                    BLKb                    BLKc

|          |
| VP_A     |
| VP_B     |
| VP_C     |

☐ Invalid Page
☐ Free Page
▧ Valid Page

<u>200</u>

CONTROLLER AND MEMORY SYSTEM CONTROLLING GARBAGE COLLECTION OPERATION AT POWER-ON, AND METHOD OF OPERATING THE CONTROLLER AND MEMORY SYSTEM

CROSS-REFERENCE TO RELATED APPLICATION

The present application claims priority under 35 U.S.C. § 119(a) to Korean patent application number 10-2022-0151234, filed on Nov. 14, 2022, in the Korean Intellectual Property Office, the entire disclosure of which is incorporated herein by reference.

BACKGROUND

1. Technical Field

The present disclosure relates to an electronic device, and more particularly, to a controller and a memory system controlling a garbage collection operation at power-on, and a method of operating the controller and the memory system.

2. Related Art

A semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device is a semiconductor memory device designed in order to resolve a limit of an integration degree of a two-dimensional semiconductor memory device, and may include a plurality of memory cells that are vertically stacked on a semiconductor substrate.

A controller may control an operation of the semiconductor memory device. When the semiconductor memory device is implemented as a flash memory device, the controller may perform a garbage collection operation on the semiconductor memory device. In the flash memory device, an erase operation on a memory block is required to be preceded in order to rewrite another data in a memory cell in which data is already stored. An erase operation unit of the flash memory device is performed in a block unit much larger than a program operation unit. In addition, a time required for the erase operation of the flash memory device is relatively longer than a time required for a read operation or a program operation. Due to a feature in which data update in a memory cell unit or a page unit is impossible, the flash memory device maintains an invalid page which is not erased after the data update. As the invalid page increases, a memory space inside the flash memory device may not be efficiently used. In order to solve such a problem, the garbage collection operation may be performed. The garbage collection may mean an operation of switching all of pages included in victim blocks to invalid pages by copying valid pages included in a plurality of victim blocks to a target block, and then erasing the victim blocks to secure the memory space inside the flash memory device. Such a garbage collection operation may be periodically performed while a memory system including a controller and a semiconductor memory device is operating, or may be performed when the memory system is powered on.

SUMMARY

According to an embodiment of the present disclosure, a method of operating a controller may include sensing power-on of a memory system including a semiconductor memory device, determining whether to delay a garbage collection operation performed during an initial operation of the memory system, based on a sudden-power off (SPO) count value, and controlling the semiconductor memory device to perform the garbage collection operation based on the determination result.

According to an embodiment of the present disclosure, a memory system may include a semiconductor memory device including a plurality of memory blocks, and a controller configured to control an operation of the semiconductor memory device. The controller determines whether to delay a garbage collection operation performed during an initial operation of the memory system based on a sudden-power off (SPO) count value after the memory system is powered on.

BRIEF DESCRIPTION OF THE DRAWINGS

FIGS. 4A and 4B are diagrams illustrating a garbage collection operation performed by the memory system 1000.

DETAILED DESCRIPTION

Specific structural or functional descriptions of embodiments according to the concept which are disclosed in the present specification or application are illustrated only to describe the embodiments according to the concept of the present disclosure, and the embodiments according to the concept of the present disclosure may be implemented in various forms and should not be construed as being limited to the embodiments described in the present specification or application.

An embodiment of the present disclosure provides a controller, a memory system, and a method of operating the controller and the memory system capable of improving operation stability by delaying an unnecessarily repetitive garbage collection operation when supply of a power voltage is unstable during an initial operation of a memory system.

Various embodiments may provide a controller, a memory system, and a method of operating the controller and the memory system capable of improving operation stability by delaying an unnecessarily repetitive garbage collection operation when supply of a power voltage is unstable during an initial operation of a memory system.

In an embodiment, the garbage collection operation may be performed during an initial operation after power-on of the memory system. In an embodiment, the controller transmits commands for performing the garbage collection operation to a semiconductor memory device included in the memory system. Through this, in an embodiment, the controller controls the garbage collection operation performed during the initial operation of the memory system.

Figure 1:
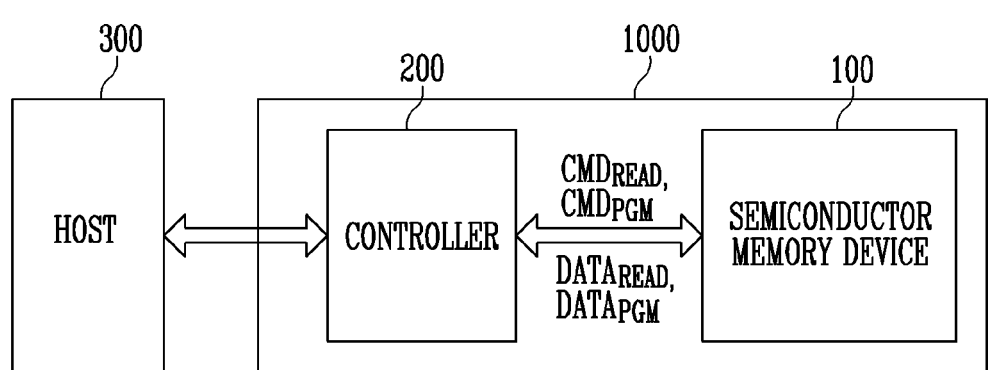
FIG. 1 is a block diagram illustrating a memory system 1000 including a controller according to an embodiment of the present disclosure.

FIG. 1 is a block diagram illustrating a memory system 1000 including a controller according to an embodiment of the present disclosure.

Referring to FIG. 1, the memory system 1000 includes a semiconductor memory device 100 and the controller 200. In addition, the memory system 1000 communicates with a host 300. The controller 200 controls an overall operation of the semiconductor memory device 100. In addition, the controller 200 controls an operation of the semiconductor memory device 100 based on a request received from the host 300. Specifically, the controller 200 may generate commands for controlling the semiconductor memory device 100. For example, the controller 200 may generate a read command CM DREAD for controlling a read operation of the semiconductor memory device 100 and a program command $CMD_{PGM}$ for controlling a program operation of the semiconductor memory device 100. In addition, although not shown in FIG. 1, the controller 200 may generate an erase command for controlling an erase operation of the semiconductor memory device 100. The generated commands $CMD_{READ}$ and $CMD_{PGM}$ may be transferred to the semiconductor memory device 100, and the semiconductor memory device 100 may perform a corresponding operation in response to the received command. For example, the semiconductor memory device 100 may perform the read operation in response to the received read command CM DREAD and transfer read data $DATA_{READ}$ to the controller 200. In addition, the semiconductor memory device 100 may receive program data $DATA_{PGM}$ together with program command $CMD_{PGM}$ and perform the program operation based thereon.

During a garbage collection operation of the memory system 1000, the controller 200 may control the operation of the semiconductor memory device 100 based on the read command $CMD_{READ}$ and the program command $CMD_{PGM}$. For example, the controller 200 may control the semiconductor memory device 100 to read valid data of a victim block through the read command $CMD_{READ}$, and control the semiconductor memory device 100 to program the read valid data into a target block through the program command $CMD_{PGM}$.

Figure 2:
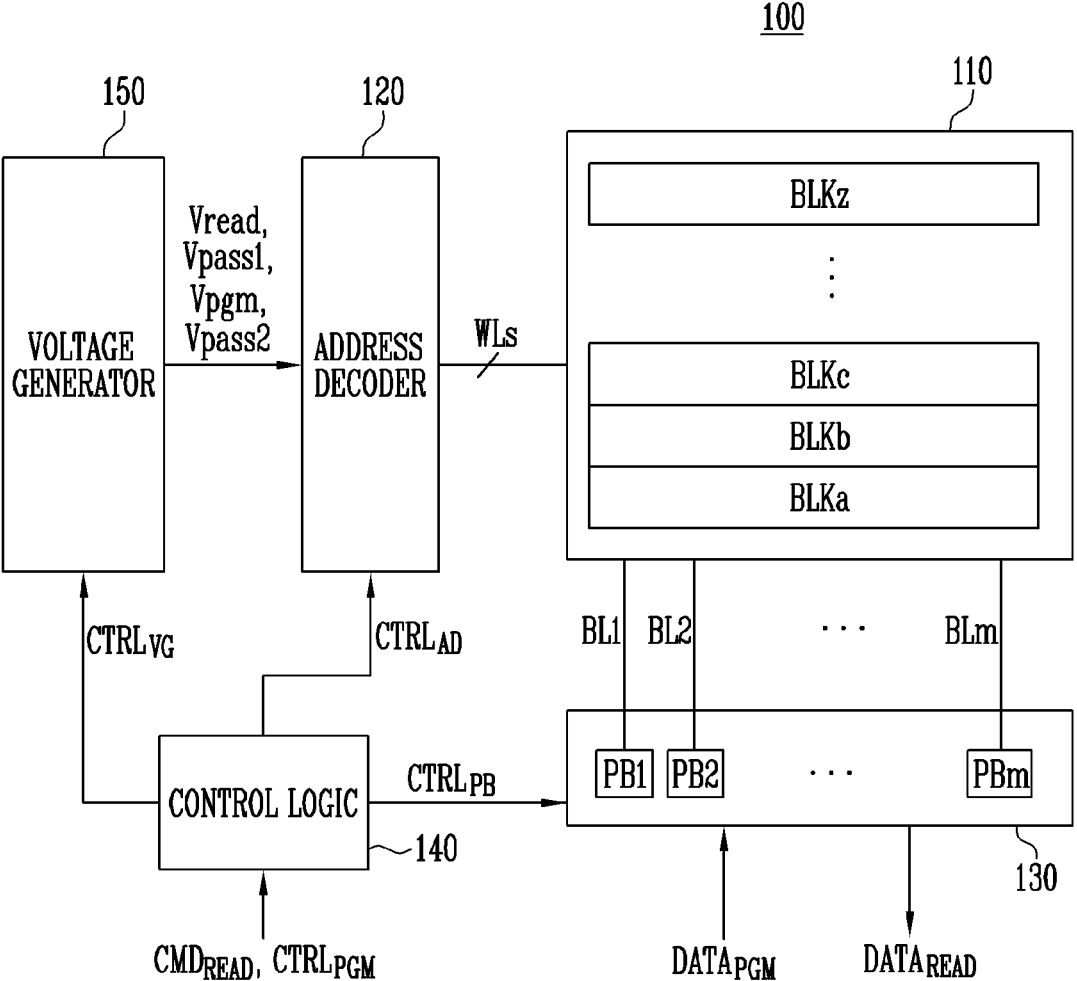
FIG. 2 is a block diagram illustrating a semiconductor memory device included in FIG. 1.

FIG. 2 is a block diagram illustrating the semiconductor memory device included in FIG. 1.

Referring to FIG. 2, the semiconductor memory device 100 includes a memory cell array 110, an address decoder 120, a read and write circuit 130, control logic 140, and a voltage generator 150. The control logic 140 may be implemented as hardware, software, or a combination of hardware and software. For example, the control logic 140 may be a control logic circuit operating in accordance with an algorithm and/or a processor executing control logic code.

The memory cell array 110 includes a plurality of memory blocks BLKa to BLKz. The plurality of memory blocks BLKa to BLKz are connected to the address decoder 120 through word lines WLs. The plurality of memory blocks BLKa to BLKz are connected to the read and write circuit 130 through bit lines BL1 to BLm. Each of the plurality of memory blocks BLKa to BLKz includes a plurality of memory cells. As an embodiment, the plurality of memory cells are non-volatile memory cells, and may be configured of nonvolatile memory cells having a vertical channel structure.

The address decoder 120, the read and write circuit 130, and the voltage generator 150 operate as a peripheral circuit that drives the memory cell array 110. The peripheral circuit may perform the read operation, the program operation, and the erase operation on the memory cell array 110, based on control of the control logic 140. The address decoder 120 is connected to the memory cell array 110 through the word lines WLs. The address decoder 120 is configured to operate in response to control of the control logic 140. Specifically, the control logic 140 transfers an address decoding control signal $CTRL_{AD}$ to the address decoder 120, and the address decoder 120 performs a decoding operation based on the address decoding control signal $CTRL_{AD}$.

Specifically, the address decoder 120 is configured to decode a block address among received addresses. The address decoder 120 selects at least one memory block according to the decoded block address. During the read operation, the address decoder 120 applies a read voltage Vread generated by the voltage generator 150 to a selected word line connected to a selected memory block, and applies a first pass voltage Vpass1 to remaining unselected word lines. In addition, during a program verify operation, the address decoder 120 applies a program voltage Vpgm generated by the voltage generator 150 to the selected word line and applies a second pass voltage Vpass2 to the remaining unselected word lines.

The read and write circuit 130 includes a plurality of page buffers PB1 to PBm. The read and write circuit 130 may operate as a "read circuit" during the read operation of the memory cell array 110 and may operate as a "write circuit" during the write operation of the memory cell array 110. The plurality of page buffers PB1 to PBm are connected to the memory cell array 110 through the bit lines BL1 to BLm. The read and write circuit 130 performs the read operation or the program operation in response to a page buffer control signal $CTRL_{PB}$ output from the control logic 140.

During the read operation, the read and write circuit 130 stores read data $DATA_{READ}$ read by sensing data of the memory cell, and then outputs the read data $DATA_{READ}$ to an input/output buffer (not shown) of the semiconductor memory device 100.

The control logic 140 is connected to the address decoder 120, the read and write circuit 130, and the voltage generator 150. The control logic 140 receives the program command $CMD_{PGM}$ and the read command $CMD_{READ}$ of the semiconductor memory device 100. The control logic 140 may perform a garbage collection operation in response to the received program command $CMD_{PGM}$ and read command $CMD_{READ}$. The control logic 140 may control an operation of the voltage generator 150 through a voltage generation control signal $CTRL_{VG}$. In addition, as described above, the control logic 140 may control an operation of the address decoder 120 through the address decoding control signal $CTRL_{AD}$. Meanwhile, the control logic 140 may control an operation of page buffers PB1 to PBm in the read and write circuit 130 through the page buffer control signal $CTRL_{PB}$.

The voltage generator 150 generates the read voltage Vread and the first pass voltage Vpass1 used during the read operation in response to the voltage generation control signal $CTRL_{VG}$ output from the control logic 140. In addition, the voltage generator 150 generates the program voltage Vpgm and the second pass voltage Vpass2 used during the program operation in response to the voltage generation control signal $CTRL_{VG}$ output from the control logic 140.

During the garbage collection operation, the semiconductor memory device 100 may perform the read operation on the valid page included in the victim block in response to the read command $CMD_{READ}$ received from the controller 200, and transfer the read data $DATA_{READ}$ generated as a result of the read operation to the controller 200. Thereafter, the controller 200 may transfer the received valid page data to the semiconductor memory device 100 as program data $DATA_{PGM}$. At this time, an address indicating an empty space of the target block may be provided to the semiconductor memory device 100 as a program address. The semiconductor memory device 100 may program the program data $DATA_{PGM}$ received together with the program command $CMD_{PGM}$ into the target block.

Figure 3:
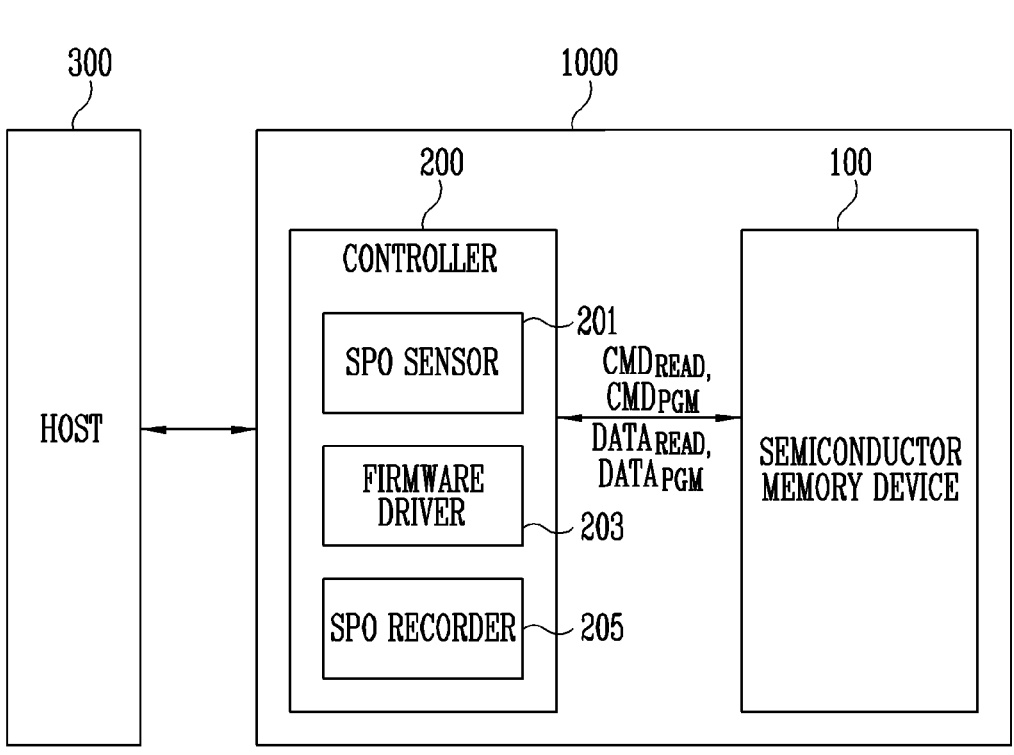
FIG. 3 is a block diagram illustrating the controller of FIG. 1 in more detail.

FIG. 3 is a block diagram illustrating the controller of FIG. 1 in more detail.

Referring to FIG. 3, the controller 200 may include an SPO sensor 201, a firmware driver 203, and an SPO recorder 205. The SPO sensor 201 may sense a situation in which power supplied to the memory system 1000 is suddenly cut off, that is, occurrence of sudden-power off (SPO). When sensing the SPO, the controller 200 may perform an overall operation for stopping an operation of the memory system 1000. To this end, when the SPO sensor 201 senses the occurrence of the SPO, the SPO sensor 201 may notify the firmware driver 203 of this.

The firmware driver 203 may drive firmware for controlling the semiconductor memory device 100. More specifically, the firmware driver 203 may execute codes stored in a read-only memory (ROM). Meanwhile, firmware may control an overall operation of the memory system 1000. When the firmware driver 203 is notified of the occurrence of the SPO from the SPO sensor 201, the firmware driver 203 may perform an overall operation to stably power off the memory system 1000. In addition, when the memory system 1000 is powered on again after the memory system 1000 is powered off according to the SPO, the firmware driver 203 may control an initial operation for booting of the memory system 1000.

Meanwhile, the controller 200 may perform the garbage collection operation during the initial operation of the memory system 1000. To this end, the controller 200 may select the victim block, transfer the read command $CMD_{READ}$ for reading the valid page data in the victim block to the semiconductor memory device 100, and receive the read data $DATA_{READ}$ corresponding to the valid page from the semiconductor memory device. The controller 200 may select the target block and transfer the received valid page data as the program data $DATA_{PGM}$ to the semiconductor memory device 100 together with the program command $CMD_{PGM}$. The semiconductor memory device 100 may program the received program data $DATA_{PGM}$ into the target block.

When the SPO occurs while performing the garbage collection operation during the initial operation of the memory system 1000, the firmware driver 203 may store the occurrence of the corresponding SPO in the SPO recorder 205. More specifically, when the firmware driver 203 is notified of the occurrence of the SPO from the SPO sensor 201 during the garbage collection operation included in the initial operation of the memory system 1000, the firmware driver 203 may update an SPO count value stored in the SPO recorder 205. Meanwhile, when the SPO does not occur during the garbage collection operation included in the initial operation of the memory system 1000, the firmware driver 203 may initialize the SPO count value stored in the SPO recorder 205.

In addition, the firmware driver 203 may delay performance of the garbage collection operation during the initial operation of the memory system 1000 when the SPO count value is equal to or greater than a predetermined reference value. The word "predetermined" as used herein with respect to a parameter, such as a predetermined reference value, time, and delay time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The SPO recorder 205 may record the number of SPOs successively generated while the garbage collection operation is performed during the initial operation of the memory system 1000. That is, the SPO recorder 205 may store the SPO count value. In an embodiment, the SPO recorder 205 may be configured of a nonvolatile memory device. In this case, even though power supply of the memory system 1000 is stopped, the SPO count value stored in the SPO recorder 205 may be maintained. In another embodiment, the SPO recorder 205 may be configured of a volatile memory device. In this case, the SPO count value stored in the SPO recorder 205 before the power supply of the memory system 1000 is stopped may be stored in the semiconductor memory device 100. Thereafter, when the memory system 1000 is powered on again, the SPO count value stored in the semiconductor memory device 100 may be read and stored in the SPO recorder 205 during a booting process of the memory system 1000.

In accordance with the controller 200 and a method of operating the same according to an embodiment of the present disclosure, when the SPO repeatedly occurs while the garbage collection operation is performed during the initial operation of the memory system 1000, the performance of the garbage collection operation during the initial operation is intentionally delayed. Thus, according to an embodiment, a problem in which the number of free blocks decreases due to repetition of garbage collection in the initial operation of the memory system 1000 may be improved.

Figure 4A:
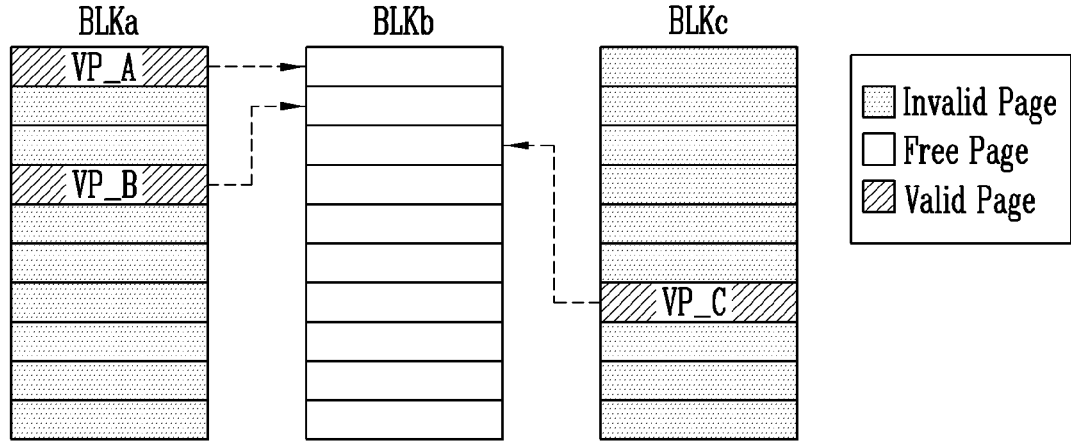
Figure 4B:
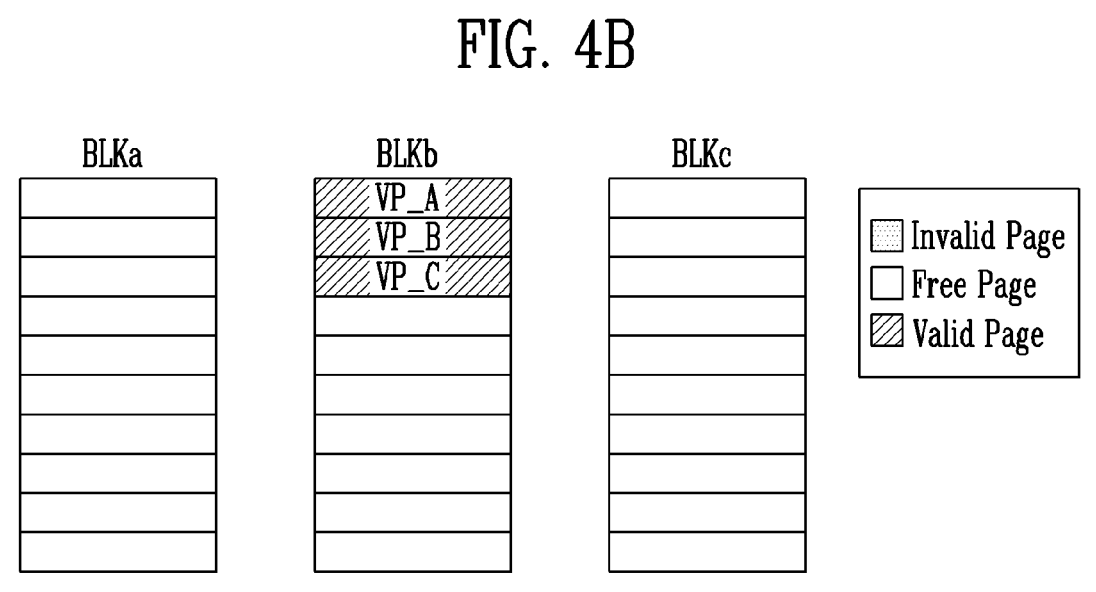

FIGS. 4A and 4B are diagrams illustrating the garbage collection operation performed by the memory system 1000.

Referring to FIGS. 4A and 4B, three memory blocks BLKa, BLKb, and BLKc included in the memory cell array 110 of the semiconductor memory device 100 are shown as examples. Each of the memory blocks BLKa, BLKb, and BLKc includes a plurality of pages. Each of the pages may be any one of a valid page, an invalid page, or a free page. Valid pages and invalid pages are distinguished from each other in that valid data is stored in valid pages and invalid data is already stored in invalid pages. On the other hand, the threshold voltage distribution of memory cells included in the free page is all included in the erase state, but the threshold voltage distribution of memory cells included in the invalid page spans the erase state and at least one program state, thus invalid page and free page are distinct from each other.

In FIG. 4A, the memory blocks BLKa and BLKc are the victim blocks, and the memory block BLKb is the target block. The target block is selected from among the free blocks in which data is not programmed.

When the number of free blocks in the semiconductor memory device 100 included in the memory system 1000 is insufficient, the controller 200 selects the victim blocks BLKa and BLKc, and copies valid page data VP_A, VP_B, and VP_C included in the victim blocks to the target block BLKb. As such a garbage collection operation is performed, the memory blocks BLKa and BLKc are returned to the free blocks as shown in FIG. 4B. Accordingly, the number of free blocks may increase.

Figure 5:
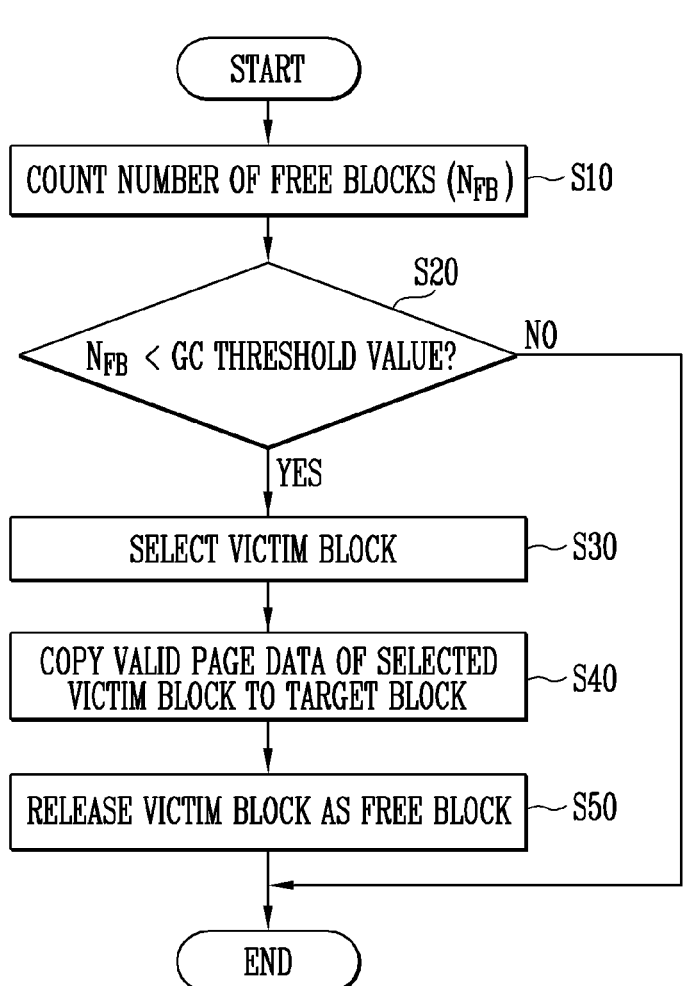
FIG. 5 is a flowchart illustrating the garbage collection operation performed by the memory system 1000.

FIG. 5 is a flowchart illustrating the garbage collection operation performed by the memory system 1000.

Referring to FIG. 5, the controller 200 of the memory system 1000 counts the number of free blocks ($N_{FB}$) (S10). The free block may refer to a memory block in which data is not written among the memory blocks BLKa to BLKz in the memory cell array. When the number of free blocks ($N_{FB}$) is insufficient, the garbage collection operation is required to be performed.

In step S20, the counted number of free blocks ($N_{FB}$) is compared with a GC threshold value. The "GC threshold value" may refer to a reference number of free blocks for determining whether to perform the garbage collection operation. When the number of free blocks ($N_{FB}$) is equal to or greater than the GC threshold value (S20: No), since the garbage collection operation is not required, an operation may be ended. In this case, after a certain time elapses, step S10 may be performed again to count the number of free blocks ($N_{FB}$).

When the number of free blocks ($N_{FB}$) is less than the GC threshold value (S20: Yes), since the number of free blocks is insufficient, the garbage collection operation may be performed. A device GC is performed by steps S30 to S50 described below.

For the device GC, first, the victim block is selected (S30). In step S30, a memory block including a relatively large number of invalid pages may be selected as the victim block. In step S30, at least one or more victim blocks may be selected.

In step S40, the valid page data of the selected victim block is copied to the target block. The target block may be selected from among the free blocks in which data is not stored.

After copying of the valid page data is completed, the victim block is released as the free block (S50). Accordingly, since at least one victim block is released as the free block, the number of free blocks increases.

In an embodiment, the operation shown in FIG. 5 may be periodically performed when the memory system 1000 is in a turn on state. In another embodiment, the operation shown in FIG. 5 may be performed in an idle time of the memory system 1000 when the memory system 1000 is in a turn on state. In another embodiment, the operation shown in FIG. 5 may be performed during the initial operation of the memory system 1000 when the memory system 1000 is switched from a turn-off state to a turn-on state.

Figure 6:
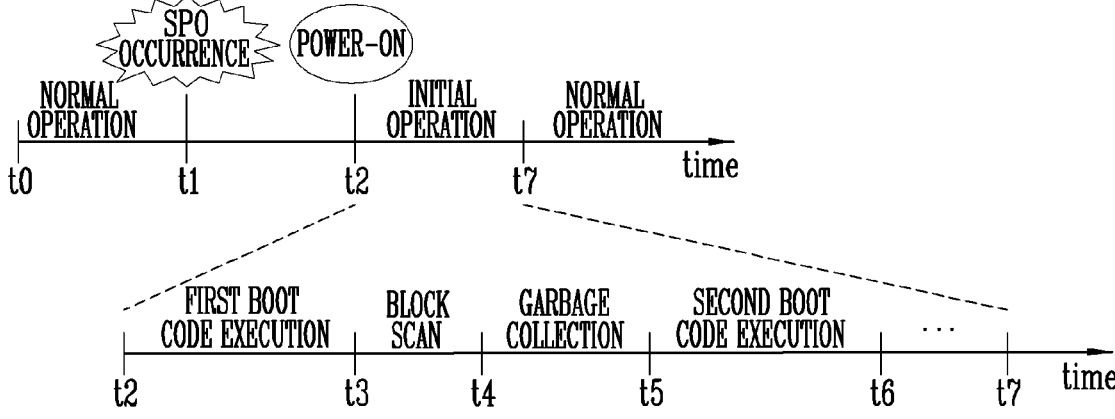
FIG. 6 is a diagram illustrating an operation of the controller when a sudden-power off (SPO) occurs.

FIG. 6 is a diagram illustrating an operation of the controller when the SPO occurs.

Referring to FIG. 6, a state of the memory system 1000 according to a time and an operation of the controller included in the memory system 1000 are shown. During a period t0 to t1, the memory system 1000 may normally operate. At a time t1, the SPO may occur. In this case, the memory system 1000 may be powered off after the time t1 and then may be powered on at a time t2. When the memory system 1000 is powered on, the initial operation may be performed during a period t2 to t7. After a time t7, the memory system 1000 may normally operate.

Meanwhile, the initial operation of the memory system performed during the time t2 to t7 is described in detail.

Referring to FIG. 6, when the memory system 1000 is turned on at the time t2, the firmware driver 203 of the controller 200 may execute a first boot code. The first boot code may be codes to be executed first in the booting process of the memory system 1000. After the first boot code is executed during a period t2 to t3, a block scan operation may be performed during a period t3 to t4. The block scan operation may include an operation of checking a state of each of the memory blocks included in the semiconductor memory device 100. In an embodiment, an operation of checking the number of free blocks ($N_{FB}$) among the memory blocks included in the semiconductor memory device 100 may be performed during the block scan operation.

During the block scan operation, when it is determined that the number of free blocks among the memory blocks included in the semiconductor memory device 100 is less than the GC threshold value, the firmware driver 203 of the controller 200 may control the semiconductor memory device 100 to perform the garbage collection operation during a period t4 to t5. By the garbage collection operation, the valid data stored in the plurality of victim blocks is stored in the target block, and the plurality of victim blocks are switched to the free blocks. By performing the garbage collection operation, the number of free blocks included in the semiconductor memory device 100 may be increased.

Thereafter, during a period t5 to t6, the firmware driver 203 may execute a second boot code. The second boot code may be codes executed in a lower order than the first boot code. Meanwhile, although not shown in FIG. 6, other initial operations may be further performed during a period t6 to t7.

The garbage collection operation may include an operation of storing the valid data stored in the plurality of victim blocks in the target block of a free block state, and then switching the victim block including only the invalid data to the free block. Therefore, when the SPO occurs in the memory system during the garbage collection operation included in the initial operation, the number of free blocks may rather decrease. Therefore, when the SPO repeatedly occurs during the garbage collection operation included in the initial operation, the number of free blocks included in the semiconductor memory device 100 may rapidly decrease. The present disclosure is described in more detail with reference to FIG. 7.

Figure 7:
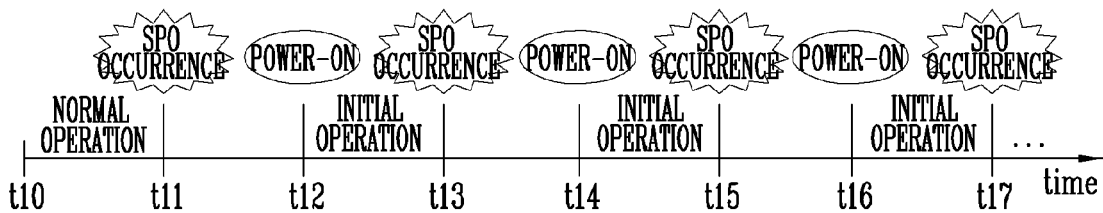
FIG. 7 is a diagram illustrating a situation in which the SPO repeatedly occurs during an initial operation.

FIG. 7 is a diagram illustrating a situation in which the SPO repeatedly occurs during the initial operation.

Referring to FIG. 7, during a period t10 to t11, the memory system 1000 may normally operate. The SPO may occur at a time t11. In this case, the memory system 1000 may be powered off after the time t11 and then powered on at a time t12. When the memory system 1000 is powered on, the initial operation may be performed from the time t12. The SPO may occur at a time t13 while the garbage collection operation is performed during the initial operation of the memory system 1000. Since the garbage collection operation is stopped due to the SPO before the victim block is switched to the free block after the garbage collection operation is performed, the number of free blocks may decrease.

In a typical garbage collection operation, the number of free blocks somewhat decreases in a process of selecting the target block. However, after the valid data of the victim blocks is stored in the target block, the plurality of victim blocks are switched to the free block state. That is, since the plurality of victim blocks are switched to the free blocks when the garbage collection operation is completed, the number of free blocks increases during the entire garbage collection operation despite the decrease of the number of free blocks due to the target block selection.

However, when the SPO occurs while the valid data is stored in the target block according to the performance of the garbage collection operation during the initial operation of the memory system, the victim block is not switched to the free block state because the garbage collection operation is not completed. That is, an increase of the number of free blocks according to the garbage collection operation does not occur. In addition, when the garbage collection operation is started, any one of the free blocks is selected as the target block. In this process, the number of free blocks decreases. As a result, when the SPO occurs while the valid data is stored in the target block according to the performance of the garbage collection operation during the initial operation of the memory system, the number of free blocks decreases due to the target block selection. The memory system 1000 may be powered off after the time t13 and then powered on at a time t14. When the memory system 1000 is powered on, the initial operation may be performed from the time t14. While the garbage collection operation is performed during the initial operation of the memory system 1000, the SPO may occur again at a time t15. Since the garbage collection operation is stopped due to the SPO before the victim block is switched to the free block after the garbage collection operation is performed, the number of free blocks may decrease. The same process may be repeated also after a time t16.

Referring to FIG. 7, when the SPO repeatedly occurs during the initial operation of the memory system 1000, the number of free blocks included in the semiconductor memory device 100 may decrease as the garbage collection operation is performed or stopped. This may result in deterioration of operation stability of the memory system 1000.

During the initial operation of the memory system 1000, in particular during the performance of the garbage collection operation, the SPO may repeatedly occur due to various reasons. In particular, after the memory system 1000 is powered on, a certain time may be required to stably supply power to each of components of the memory system 1000. That is, when the garbage collection operation is performed before stable power is supplied to the components of the memory system 1000, the SPO may occur in the memory system 1000 due to unstable power supply.

In accordance with a controller and a method of operating the same according to an embodiment of the present disclosure, when the SPO repeatedly occurs while the garbage collection operation is performed during the initial operation of the memory system 1000, a time point at which the garbage collection operation is performed during the initial operation is delayed. Accordingly, in an embodiment, a problem in which the number of free blocks decreases due to repetition of the garbage collection in the initial operation of the memory system 1000 may be improved.

Figure 8:
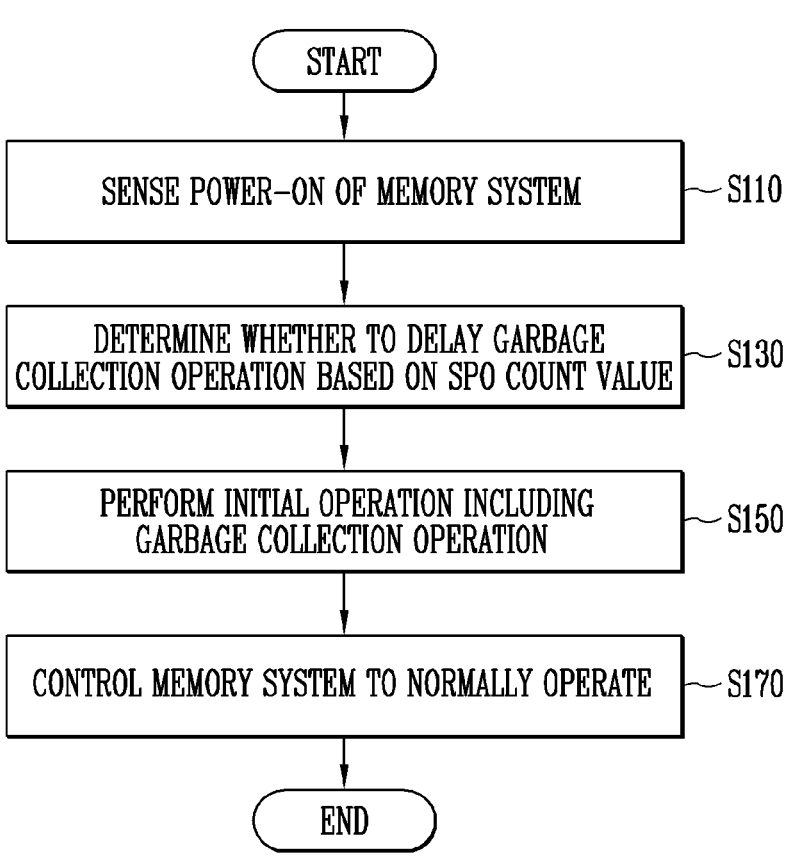
FIG. 8 is a flowchart schematically illustrating a method of operating a controller according to an embodiment of the present disclosure.

FIG. 8 is a flowchart schematically illustrating a method of operating a controller according to an embodiment of the present disclosure.

Referring to FIG. 8, a method of operating a controller according to an embodiment of the present disclosure includes sensing power-on of a memory system (S110), determining whether to delay a garbage collection operation based on an SPO count value (S130), performing an initial operation including the garbage collection operation (S150), and controlling the memory system to normally operate (S170).

In step S110, the controller 200 may sense power-on of the memory system. As the memory system 1000 is powered on, the firmware driver 203 of the controller 200 may perform the initial operation.

In step S130, it may be determined whether to delay the garbage collection operation based on the SPO count value. To this end, the firmware driver 203 of the controller 200 may refer the SPO count value stored in the SPO recorder 205. When the SPO count value is less than a predetermined reference value, the firmware driver 203 may determine to perform the garbage collection operation without delay. When the SPO count value is equal to or greater than the predetermined reference value, the firmware driver 203 may determine to perform the garbage collection operation after a predetermined delay time.

In step S150, the firmware driver 203 may perform the initial operation including the garbage collection operation. At this time, according to the determination in step S130, the garbage collection operation may be performed without delay or after the predetermined delay time.

Meanwhile, when the SPO occurs during the garbage collection operation of step S150, the SPO count value may be updated. In this case, the memory system may be powered off according to the SPO without proceeding to step S170.

On the other hand, when the SPO does not occur during the garbage collection operation of step S150, the SPO count value may be initialized. Thereafter, in step S170, the controller 200 may control the memory system 1000 to normally operate.

Figure 9:
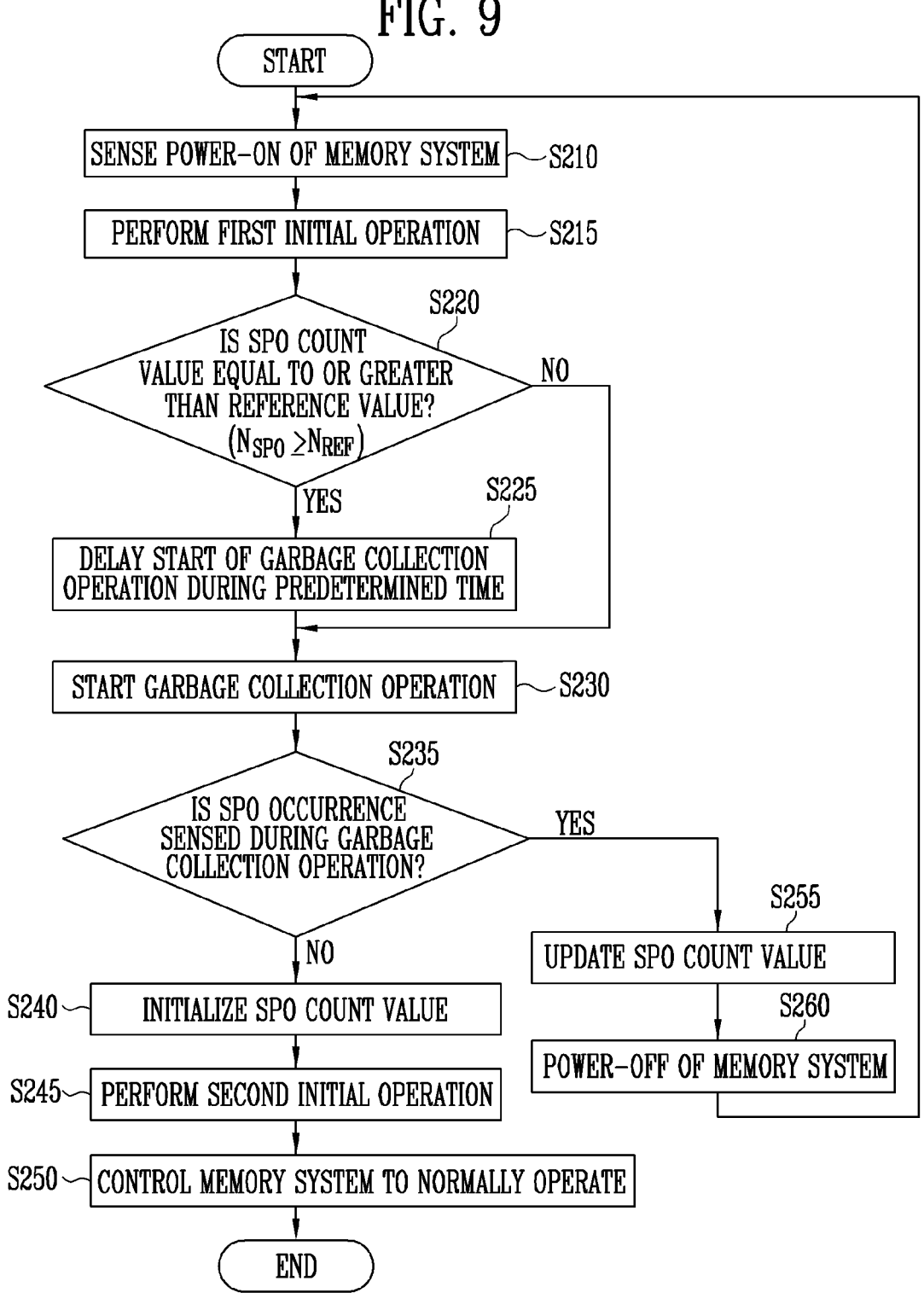
FIG. 9 is a flowchart illustrating a method of operating a controller according to an embodiment of the present disclosure in more detail.

FIG. 9 is a flowchart illustrating a method of operating a controller according to an embodiment of the present disclosure in more detail. More specifically, FIG. 9 is a flowchart illustrating a method of operating a controller according to an embodiment of the present disclosure from a viewpoint different from that of FIG. 8.

In step S210, the controller 200 may sense power-on of the memory system. As the memory system 1000 is powered on, the firmware driver 203 of the controller 200 may perform the initial operation. Step S210 of FIG. 9 may be substantially the same as step S110 of FIG. 8.

In step S215, the firmware driver 203 of the controller 200 may perform a first initial operation. In an embodiment, the first initial operation may include an operation of executing the first boot code described with reference to FIG. 6. As described above, the first boot code may be codes to be executed first in the booting process of the memory system 1000. In addition, in an embodiment, the first initial operation may include the block scan operation described with reference to FIG. 6.

In step S220, the firmware driver 203 may determine whether the SPO count value $N_{SPO}$ is equal to or greater than a predetermined reference value $N_{REF}$. To this end, the firmware driver 203 may refer to the SPO recorder 205. When the SPO count value $N_{SPO}$ stored in the SPO recorder 205 is equal to or greater than the reference value $N_{REF}$ (S220: Yes), the firmware driver 203 may delay a start of the garbage collection operation during a predetermined time (S225). In an embodiment, this may be to prevent the number of free blocks from decreasing due to the garbage collection operation as the SPO is repeated.

A time in which the garbage collection operation is delayed may be variously set as needed. As the set time in which the garbage collection operation is delayed increases, a probability in which the SPO occurs during the garbage collection operation decreases. Accordingly, a possibility in which the number of free blocks decreases also decreases.

On the other hand, a time required for the memory system 1000 to complete the initial operation after the SPO increases. The set time in which the garbage collection operation is delayed decreases, the probability in which the SPO occurs during the garbage collection operation increases. Accordingly, the possibility in which the number of free blocks decreases also increases. On the other hand, the time required for the memory system 1000 to complete the initial operation after the SPO decreases.

When the SPO count value $N_{SPO}$ is equal to or greater than the reference value $N_{REF}$ (S220: Yes), the garbage collection operation starts after delaying the start of the garbage collection operation (S225) (S230). On the other hand, when the SPO count value $N_{SPO}$ is less than the reference value $N_{REF}$ (S220: No), the garbage collection operation starts immediately without performing step S225 (S230). Therefore, in this case, the garbage collection operation is not delayed.

Meanwhile, after the garbage collection operation starts (S230), when the SPO occurrence is sensed during the garbage collection operation (S235: Yes), the firmware driver 203 updates the SPO count value (S255). More specifically, in step S255, the firmware driver 203 determines a value obtained by adding 1 to the existing SPO count value stored in the SPO recorder 205 as a new SPO count value. The exist SPO count value is deleted, and the new SPO count value is stored in the SPO recorder 205.

Thereafter, the controller 200 may control operations for powering off the memory system 1000 (S260). After step S260, the memory system 1000 may be powered on again. In this case, the method proceeds to step S210.

After starting the garbage collection operation (S230), when the SPO occurrence is not sensed and the garbage collection operation is completed (S235: No), the firmware driver 203 initializes the SPO count value (S240). More specifically, in step S240, the firmware driver 203 sets the SPO count value stored in the SPO recorder 205 as an initial value. The initial value may be variously selected according to an embodiment. In an embodiment, the initial value may be 0.

Thereafter, the firmware driver 203 performs a second initial operation (S245). In an embodiment, the second initial operation may include execution of the second boot code described above with reference to FIG. 6.

When the second initial operation (S245) is completed, the controller 200 may control the memory system to normally operate (S250).

According to the method of operating the controller described with reference to FIG. 9, when the SPO repeatedly occurs while the garbage collection operation is performed during the initial operation of the memory system 1000, the performance time point of the garbage collection operation during the initial operation is delayed (S225). Accordingly, in an embodiment, a problem in which the number of free blocks decreases due to repetition of the garbage collection in the initial operation of the memory system 1000 may be improved.

Figure 10:
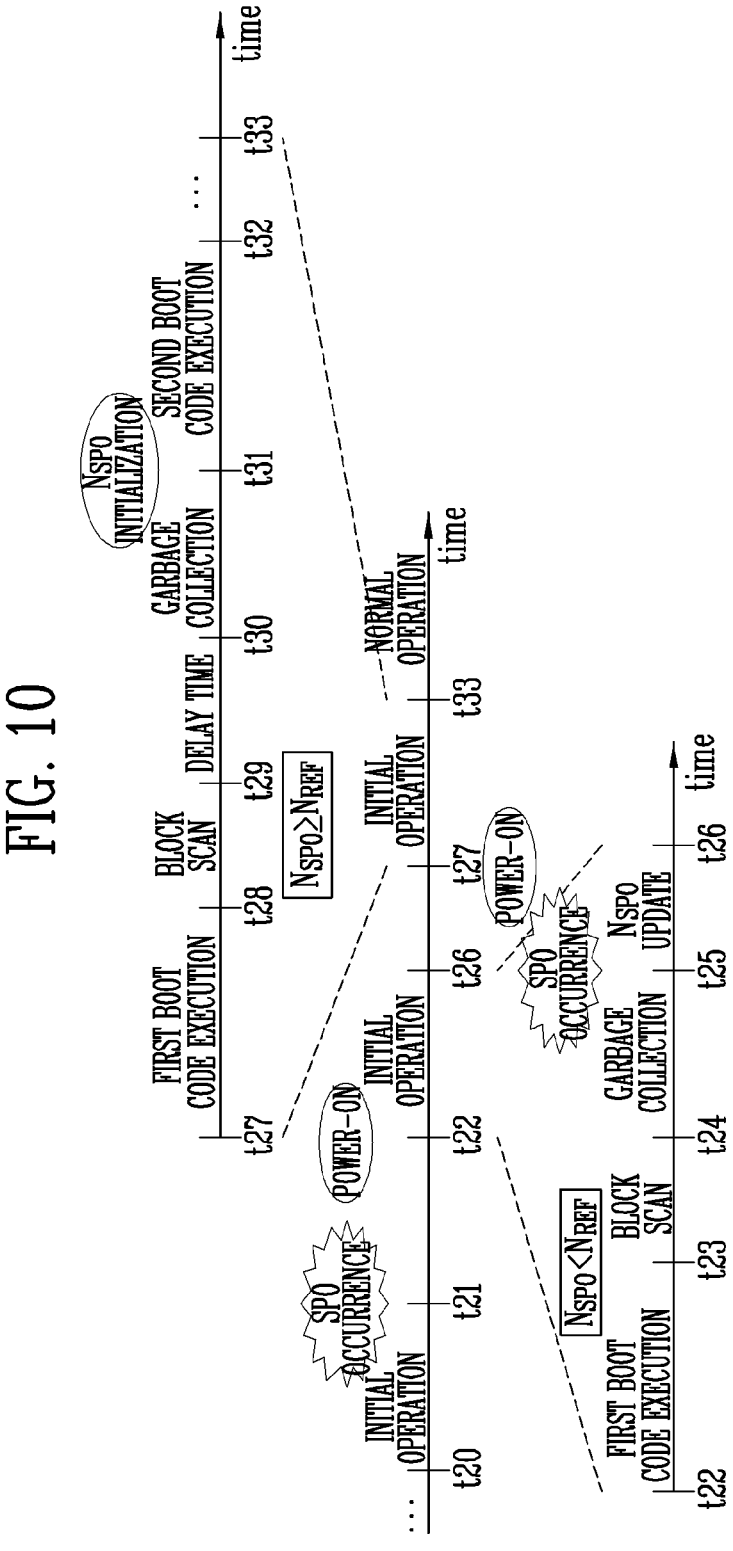
FIG. 10 is a diagram illustrating an operation of a controller according to an embodiment of the present disclosure.

FIG. 10 is a diagram illustrating an operation of a controller according to an embodiment of the present disclosure.

Referring to FIG. 10, a state of the memory system 1000 according to a time and an operation of the controller included in the memory system 1000 are shown. Before a time t20, the memory system may be in a power-off state. At the time t20, the memory system 1000 may be powered on, and the initial operation of the memory system 1000 may be performed during a period t20 to t21. Meanwhile, the SPO may occur at a time t21, the memory system 1000 may be powered off after the time t21, and then the memory system 1000 may be powered on at a time t22. Accordingly, the initial operation of the memory system may be performed during a period t22 to t26. As described above, the SPO may repeatedly occur after the memory system 1000 is powered on. Hereinafter, the present disclosure is described with reference to FIG. 9 together.

Referring to the period t22 to t26, the operation of the controller 200 when the SPO count value $N_{SPO}$ is less than the reference value $N_{REF}$ is shown. As the memory system 1000 is powered-on at the time t22, the controller 200 senses the power-on of the memory system (S210). Thereafter, the firmware driver 203 of the controller 200 may perform the first initial operation (S215). That is, during a period t22 to t23, the firmware driver 203 of the controller 200 may execute the first boot code, and during a period t23 to t24, the firmware driver 203 of the controller 200 may perform the block scan operation.

Thereafter, the firmware driver 203 determines whether the SPO count value $N_{SPO}$ is equal to or greater than the reference value $N_{REF}$ (S220). Since the SPO count value $N_{SPO}$ is less than the reference value $N_{REF}$ in the period t22 to t26 (S220: No), the firmware driver 203 immediately starts the garbage collection operation without delay at a time t24 (S230).

Meanwhile, FIG. 10 shows a situation in which the SPO occurs at a time t25 during the garbage collection operation. Since the SPO sensor 201 of the controller 200 senses the SPO of the memory system 1000 (S235: Yes), the firmware driver 203 updates the SPO count value $N_{SPO}$ (S255). As described above, in step S255, the update operation may be performed by adding 1 to the existing SPO count value $N_{SPO}$.

The memory system 1000 may be powered off after a time t26 when the SPO count value $N_{SPO}$ is updated (S255), and then the memory system 1000 may be powered on at the time t26. The initial operation may be performed during a period t27 to t33.

Referring to the period t27 to t33, the operation of the controller 200 when the SPO count value $N_{SPO}$ is equal to or greater than the reference value $N_{REF}$ is shown. As the memory system 1000 is powered-on at a time t27, the controller 200 senses the power-on of the memory system (S210). Thereafter, the firmware driver 203 of the controller 200 may perform the first initial operation (S215). That is, during a period t27 to t28, the firmware driver 203 of the controller 200 may execute the first boot code, and during a period t28 to t29, the firmware driver 203 of the controller 200 may perform the block scan operation.

Thereafter, the firmware driver 203 determines whether the SPO count value $N_{SPO}$ is equal to or greater than the reference value $N_{REF}$ (S220). Since the SPO count value $N_{SPO}$ is equal to or greater than the reference value $N_{REF}$ in the period t27 to t33 (S220: Yes), the firmware driver 203 delays the start of the garbage collection operation during a period t29 to t30 (S225). Thereafter, at a time t30, the firmware driver 203 starts the garbage collection operation (S230).

Meanwhile, FIG. 10 shows a situation in which the garbage collection operation is completed without the SPO during a period t30 to t31. Since the occurrence of the SPO is not sensed during the garbage collection operation (S235: No), the firmware driver 203 initializes the SPO count value $N_{SPO}$ (S240). As described above, the SPO count value $N_{SPO}$ may be initialized to 0 in step S240.

Thereafter, during a period t31 to t33, the controller 200 may perform the second initial operation (S245). For example, during a period t31 to t32, the firmware driver 203 of the controller 200 may execute the second boot code. Meanwhile, during a period t32 to t33, the controller 200 may further perform other initial operations.

From a time t33, the controller 200 may control the memory system to normally operate (S250).

Figure 11:
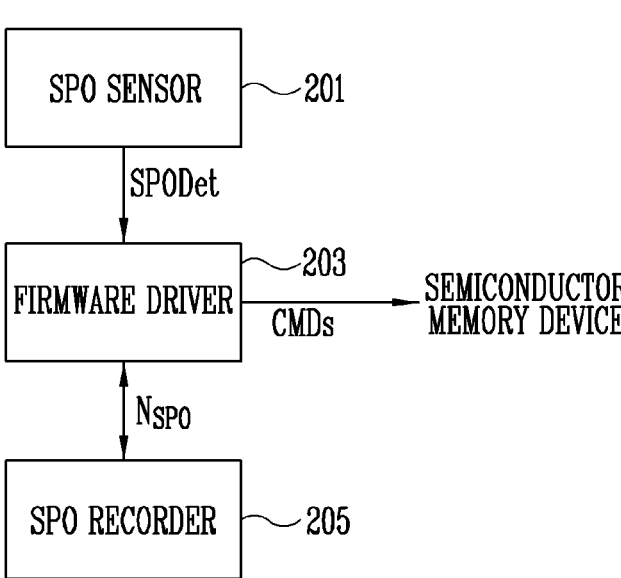
FIG. 11 is a block diagram illustrating an operation of a controller according to an embodiment of the present disclosure.

FIG. 11 is a block diagram illustrating an operation of a controller according to an embodiment of the present disclosure.

The SPO sensor 201 senses that the SPO occurs in the memory system 1000. When sensing the occurrence of the SPO, the SPO sensor generates an SPO sensing signal SPODet and transfers the SPO sensing signal SPODet to the firmware driver 203.

The firmware driver 203 may receive the SPO sensing signal SPODet from the SPO sensor 201. Meanwhile, when the memory system 1000 is powered on and the initial operation is started, the firmware driver 203 determines whether the SPO count value $N_{SPO}$ is equal to or greater than the reference value $N_{REF}$ (S220). To this end, the SPO recorder 205 may transfer the SPO count value $N_{SPO}$ to the firmware driver 203.

In addition, the firmware driver 203 may perform the first initial operation, the garbage collection operation, and the second initial operation. When the semiconductor memory device 100 is required to be controlled during the first initial operation, the garbage collection operation, and the second initial operation, the firmware driver 203 may generate commands CMDs for controlling the semiconductor memory device 100, and transfer the generated commands CMDs to the semiconductor memory device 100.

Meanwhile, when the SPO occurrence is sensed during the garbage collection operation (S235: Yes), the firmware driver may update the SPO count value $N_{SPO}$ (S255), and transfer the updated SPO count value $N_{SPO}$ to the SPO recorder 205. In addition, when the SPO occurrence is not sensed during the garbage collection operation (S235: No), the firmware driver may initialize the SPO count value $N_{SPO}$ (S240), and transfer the initialized SPO count value $N_{SPO}$ to the SPO recorder 205.

The SPO recorder 205 may store the SPO count value $N_{SPO}$ received from the firmware driver 203.

As described above, in accordance with the controller according to an embodiment of the present disclosure, when the SPO repeatedly occurs while the garbage collection operation is performed during the initial operation of the memory system 1000, the performance time point of the garbage collection operation during the initial operation is delayed. Accordingly, in an embodiment, a problem in which the number of free blocks decreases due to repetition of the garbage collection in the initial operation of the memory system 1000 may be improved.

What is claimed is:

1. A method of operating a controller, the method comprising:
   sensing power-on of a memory system including a semiconductor memory device;
   determining whether to delay an initial garbage collection operation for power stable time based on an initial sudden-power off (SPO) count value which indicates the number of SPOs that occurred during performing the initial garbage collection; and
   controlling the semiconductor memory device to perform the initial garbage collection operation before ending the initial operation corresponding to the power-on based on the determination result, wherein the initial garbage collection operation is performed during an initial operation for booting of the memory system;
   wherein the power stable time is a certain time;
   wherein determining whether to delay the initial garbage collection operation comprises:
   determining whether the initial SPO count value is equal to or greater than a predetermined reference value; and
   starting the initial garbage collection operation before the power stable time elapses in response to a determination that the SPO count value is less than the predetermined reference value.

2. The method of claim 1, wherein determining whether to delay the initial garbage collection operation further comprises:
   delaying a start of the initial garbage collection operation in response to determination that the initial SPO count value is equal to or greater than the predetermined reference value; and
   starting the initial garbage collection operation.

3. The method of claim 1, wherein controlling the semiconductor memory device to perform the initial garbage collection operation comprises determining whether an SPO has occurred during the initial garbage collection operation.

4. The method of claim 3, wherein controlling the semiconductor memory device to perform the initial garbage collection operation further comprises:
   updating the initial SPO count value in response to a determination that a SPO has occurred during the initial garbage collection operation; and
   controlling power-off of the memory system.

5. The method of claim 4, wherein updating the initial SPO count value comprises determining a value obtained by adding 1 to an existing initial SPO count value as a new initial SPO count value.

6. The method of claim 3, wherein controlling the semiconductor memory device to perform the initial garbage collection operation further comprises initializing the initial SPO count value in response to determination that an SPO has not occurred during the initial garbage collection operation.

7. A memory system comprising:
   a semiconductor memory device including a plurality of memory blocks; and
   a controller configured to control an operation of the semiconductor memory device,
   wherein the controller determines whether to delay an initial garbage collection operation for power stable time based on an initial sudden-power off (SPO) count value which indicates the number of SPOs that occurred during performing the initial garbage collection, after the memory system is powered on,
   wherein the controller controls the semiconductor memory device to perform the initial garbage collection operation before ending the initial operation corresponding to the power-on based on the determination result,
   wherein the initial garbage collection operation is performed during an initial operation for booting of the memory system;
   wherein the power stable time is a certain time;
   wherein the controller comprises a firmware driver configured to:
   control the initial garbage collection operation of the semiconductor memory device; and determine whether the initial SPO count value is equal to or greater than a predetermined reference value during the initial operation of the memory system;

wherein when the initial SPO count value is less than the reference value, the firmware driver controls the semiconductor memory device to perform the initial garbage collection operation before the power stable time elapses.

8. The memory system of claim 7, wherein the controller comprises:

an SPO sensor configured to sense occurrence of the SPO and generate an SPO sensing signal; and an SPO recorder configured to store the initial SPO count value;

wherein the firmware driver receives the SPO sensing signal from the SPO sensor, receives the initial SPO count value from the SPO recorder.

9. The memory system of claim 8, wherein the firmware driver determines whether the SPO sensing signal is received during the initial garbage collection operation performed during the initial operation of the memory system.

10. The memory system of claim 9, wherein the firmware driver updates the initial SPO count value when the SPO sensing signal is received during the initial garbage collection operation performed during the initial operation of the memory system.

11. The memory system of claim 10, wherein the firmware driver sets a value obtained by adding 1 to an existing initial SPO count value as a new initial SPO count value, and transfers the new initial SPO count value to the initial SPO recorder.

12. The memory system of claim 10, wherein after updating the initial SPO count value, the firmware driver controls a power-off operation of the memory system.

13. The memory system of claim 9, wherein the firmware driver initializes the initial SPO count value when the SPO sensing signal is not received during the initial garbage collection operation performed during the initial operation of the memory system.

14. The memory system of claim 13, wherein the firmware driver controls a normal operation of the memory system after initialization of the initial SPO count value.

15. The memory system of claim 7, wherein when the initial SPO count value is equal to or greater than the reference value, the firmware driver controls the semiconductor memory device to perform the initial garbage collection operation after the power stable time elapses.

* * * * *